United States Patent
Imai et al.

(10) Patent No.: US 12,434,640 B2
(45) Date of Patent: Oct. 7, 2025

(54) MOUNTED EQUIPMENT INFORMATION ACQUISITION APPARATUS

(71) Applicant: ISUZU MOTORS LIMITED, Tokyo (JP)

(72) Inventors: Akira Imai, Fujisawa (JP); Takahiro Suesada, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 148 days.

(21) Appl. No.: 18/007,052

(22) PCT Filed: Oct. 5, 2021

(86) PCT No.: PCT/JP2021/036756
§ 371 (c)(1),
(2) Date: Jan. 27, 2023

(87) PCT Pub. No.: WO2022/030653
PCT Pub. Date: Feb. 10, 2022

(65) Prior Publication Data
US 2023/0278508 A1    Sep. 7, 2023

(30) Foreign Application Priority Data
Aug. 7, 2020  (JP) ................. 2020-134754

(51) Int. Cl.
*B60R 16/023*  (2006.01)
*G07C 5/00*  (2006.01)
*H04L 67/12*  (2022.01)

(52) U.S. Cl.
CPC ............ *B60R 16/023* (2013.01); *G07C 5/008* (2013.01); *H04L 67/12* (2013.01)

(58) Field of Classification Search
None
See application file for complete search history.

(56) References Cited

U.S. PATENT DOCUMENTS

| 2004/0062200 A1 | 4/2004 | Kesavan |
| 2004/0181324 A1* | 9/2004 | Arata ............... G08G 1/096775 701/2 |

(Continued)

FOREIGN PATENT DOCUMENTS

| CN | 1756164 A | 4/2006 |
| CN | 101151168 A | 3/2008 |

(Continued)

OTHER PUBLICATIONS

English translation of JP-2009051345-A (wherein the paragraph numbering provided coincides with any relevant citations to this reference within the accompanying Office Action) (Year: 2009).*

(Continued)

*Primary Examiner* — Jason Holloway
*Assistant Examiner* — Bryant Tang
(74) *Attorney, Agent, or Firm* — Shih IP Law Group, PLLC

(57) ABSTRACT

A mounted equipment information acquisition apparatus includes: a storage part that stores identification information of mounted equipment information including control information for controlling a mounted equipment body and the identification information for identifying the control information; and a mounted equipment information acquiring part that acquires, when the mounted equipment information is transmitted and received between a plurality of mounted equipment control devices installed in a mounted equipment body, the mounted equipment information including the mounted-equipment-side identification information stored in the storage part. The mounted equipment information acquisition apparatus 1 acquires a copy of the mounted equipment information that is transmitted and received between the plurality of mounted equipment control devices 2.

7 Claims, 5 Drawing Sheets

(56) References Cited

U.S. PATENT DOCUMENTS

| | | |
|---|---|---|
| 2010/0019881 A1 | 1/2010 | Shimura |
| 2014/0201332 A1 | 7/2014 | Kataoka et al. |
| 2015/0362544 A1 | 12/2015 | Bean |
| 2016/0098096 A1 | 4/2016 | Averill et al. |
| 2017/0105137 A1 | 4/2017 | Hung et al. |
| 2017/0339056 A1 | 11/2017 | Uno |
| 2018/0139270 A1 | 5/2018 | Inoue et al. |
| 2020/0260033 A1 | 8/2020 | Yeo et al. |
| 2020/0361262 A1 | 11/2020 | Slade et al. |
| 2023/0164457 A1 | 5/2023 | Yeo et al. |
| 2023/0278508 A1 | 9/2023 | Imai et al. |
| 2023/0278509 A1 | 9/2023 | Imai et al. |
| 2024/0020244 A1* | 1/2024 | Kono .................. G06F 13/102 |

FOREIGN PATENT DOCUMENTS

| | | | |
|---|---|---|---|
| CN | 103944830 | A | 7/2014 |
| CN | 106572073 | A | 4/2017 |
| CN | 107710294 | A | 2/2018 |
| CN | 111556261 | A | 8/2020 |
| DE | 102015012886 | A1 | 4/2016 |
| JP | 2007-196971 | A | 8/2007 |
| JP | 2009023574 | A * | 2/2009 |
| JP | 2009051345 | A * | 3/2009 |
| JP | 2014-083874 | A | 5/2014 |
| JP | 2016-111646 | A | 6/2016 |
| JP | 2022-030624 | A | 2/2022 |

OTHER PUBLICATIONS

English translation of JP-2009023574-A (wherein the paragraph numbering provided coincides with any relevant citations to this reference within the accompanying Office Action) (Year: 2009).*

International Search Report of PCT/JP2021/036756 dated Dec. 14, 2021.

* cited by examiner

MOUNTED EQUIPMENT INFORMATION ACQUISITION APPARATUS

CROSS-REFERENCE TO RELATED APPLICATIONS

The present application is a U.S. National Stage entry of PCT Application number PCT/JP2021/036756, filed on Oct. 5, 2021, which claims priority under 35 U.S.C § 119 (a) to Japanese Patent Application No. 2020-134754, filed on Aug. 7, 2020, contents of which are incorporated herein by reference in their entirety.

TECHNICAL FIELD

The present disclosure relates to a technique for transmitting and receiving information between a vehicle body and a mounted equipment body of a vehicle.

BACKGROUND OF THE INVENTION

Patent Document 1 discloses a technique of transmitting mounted equipment information output from a mounted equipment control device to a vehicle body control device installed in a vehicle body.

PRIOR ART

Patent Document

Patent Document 1: Japanese Unexamined Patent Application Publication No. 2009-023574

BRIEF DESCRIPTION OF THE INVENTION

Problem to be Solved by the Invention

A mounted equipment body is equipped with a plurality of mounted equipment control devices (mounted equipment ECUs: mounted equipment electronic control units) for controlling the mounted equipment body. The more mounted equipment control devices installed in the mounted equipment body, the more mounted equipment information is output from the mounted equipment control devices. Accordingly, it takes a long time to acquire the desired mounted equipment information.

The present disclosure focuses on these points, and its object is to acquire only necessary mounted equipment information.

Means for Solving the Problem

In a first aspect of the present disclosure, a mounted equipment information acquisition apparatus including: a storage part that stores identification information of mounted equipment information including control information for controlling a mounted equipment body and the identification information for identifying the control information; and a mounted equipment information acquiring part that acquires the mounted equipment information including the identification information stored in the storage part, when the mounted equipment information is transmitted and received between a plurality of mounted equipment control devices installed in the mounted equipment body, is provided.

The mounted equipment information acquiring part may acquire a copy of the mounted equipment information that is transmitted and received between the plurality of mounted equipment control devices.

The mounted equipment information acquiring part need not acquire the mounted equipment information including the identification information stored in the storage part even if the mounted equipment information including the identification information stored in the storage part is transmitted and received by the time when a predetermined time has passed after the mounted equipment information was acquired, and the mounted equipment information acquiring part may acquire the mounted equipment information including the identification information stored in the storage part if the mounted equipment information including the identification information stored in the storage part is transmitted and received between the plurality of mounted equipment control devices after a predetermined time has passed since the mounted equipment information was acquired.

The mounted equipment information acquisition apparatus may further include an output control part that outputs the mounted equipment information acquired by the mounted equipment information acquiring part to a vehicle body control device controlling a vehicle body connected to the mounted equipment body, to causes a storage part of the vehicle body control device to store the mounted equipment information acquired by the mounted equipment information acquiring part.

The mounted equipment information acquiring part may further acquire, together with the mounted equipment information, a transmission instruction for outputting the mounted equipment information to an external device, and if the mounted equipment information acquiring part acquires the transmission instruction, the output control part may cause the mounted equipment information acquired by the mounted equipment information acquiring part to be output to the external device via the vehicle body control device.

The mounted equipment information acquiring part may further acquire a transmission instruction for outputting the mounted equipment information to an external device, and if the transmission instruction is acquired together with the mounted equipment information, the output control part may cause the mounted equipment information to be transmitted to the external device without causing the mounted equipment information to be stored in the storage part of the vehicle body control device, and if only the mounted equipment information is acquired, the output control part may cause the storage part of the vehicle body control device to store the mounted equipment information.

The storage part may store acquisition information including identification information included in one or more pieces of mounted equipment information to be acquired among a plurality of pieces of the mounted equipment information that is transmitted and received between the plurality of mounted equipment control devices, and the mounted equipment information acquiring part may acquire mounted equipment information including the identification information included in the acquisition information among the plurality of pieces of mounted equipment information that is transmitted and received between the plurality of mounted equipment control devices.

The mounted equipment information acquiring part may acquire new acquisition information, and may update the acquisition information stored in the storage part to the acquired new acquisition information.

Effect of the Invention

According to the present disclosure, it is possible to acquire only necessary information.

BRIEF DESCRIPTION OF THE DRAWINGS

FIG. 8 is a flowchart showing an example of a flow of processing executed by the mounted equipment information acquisition apparatus.

DESCRIPTION OF THE EMBODIMENTS

Outline of Information Transmission System S

Figure 1:
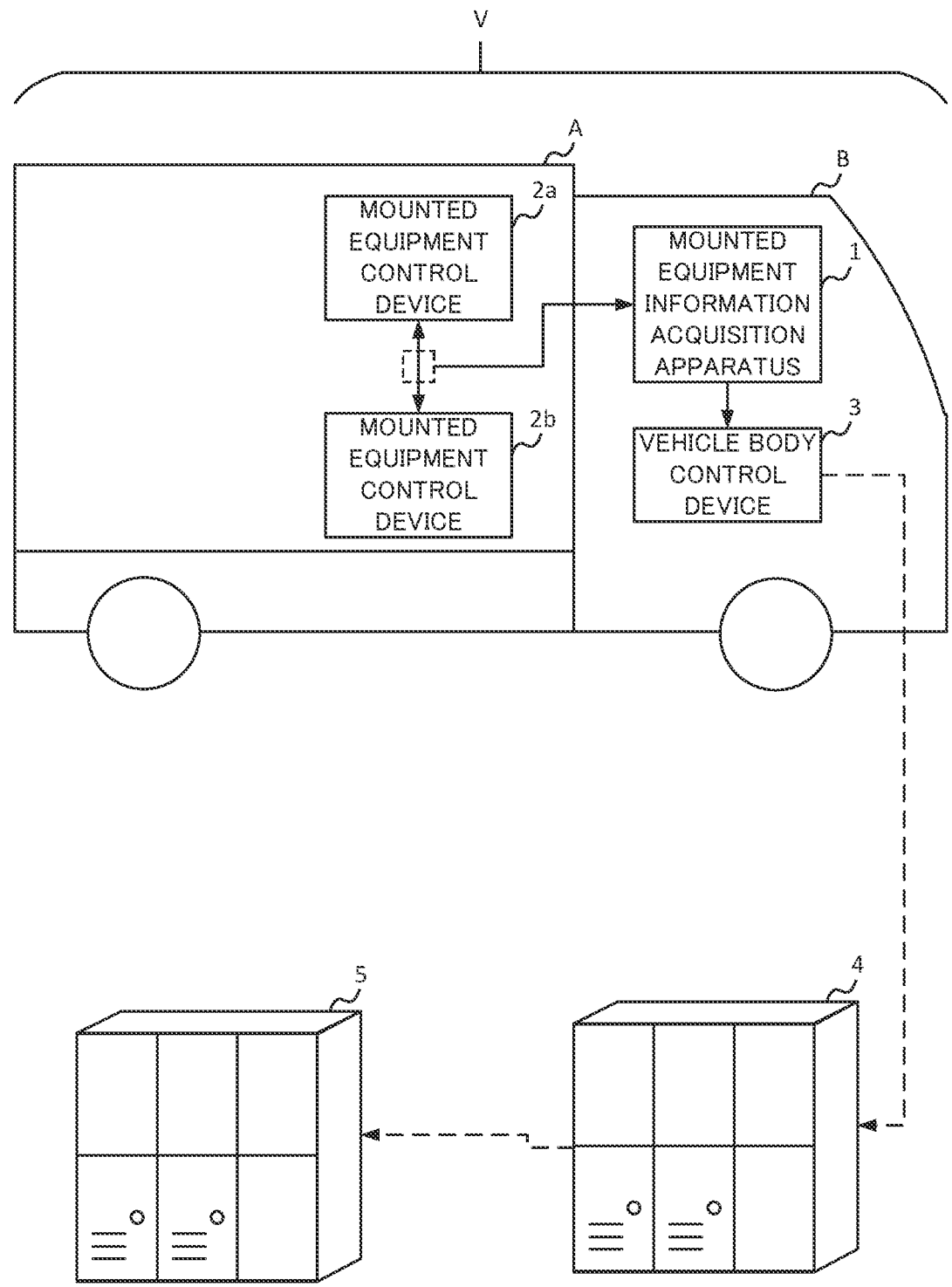
FIG. 1 is a diagram for explaining an outline of an information transmission system according to an embodiment.

FIG. 1 is a diagram for explaining an outline of an information transmission system S according to an embodiment. The information transmission system S includes a vehicle V, a vehicle body server 4, and a mounted equipment server 5. The vehicle body server 4 is a server managed by an operator who manufactures a vehicle body B of the vehicle V. The mounted equipment server 5 is a server managed by an operator who manufactures a mounted equipment body A. The vehicle V and the vehicle body server 4 are connected to each other in a manner enabling communication. Further, the vehicle body server 4 and the mounted equipment server 5 are connected to each other in a manner enabling communication. The information transmission system S transmits information concerning the vehicle body B to the vehicle body server 4. Further, the information transmission system S transmits information concerning the mounted equipment body A to the mounted equipment server 5 via the vehicle body server 4.

The vehicle V includes the mounted equipment body A and the vehicle body B connected to the mounted equipment body A. The vehicle V is a dump truck, a concrete mixer, a tank truck, a refrigerator freezer vehicle, an aerial work vehicle, a campaign vehicle, a fire engine, or an ambulance, for example. The mounted equipment body A is equipped with various devices for operating the mounted equipment body A and a sensor that detects states of the various devices. For example, if the mounted equipment body A is an aerial work vehicle, the mounted equipment body A is equipped with a lift for raising and lowering a work platform on which an operator rides during operation, and a sensor that detects the state of the lift (such as oil pressure of a cylinder).

Further, the mounted equipment body A is equipped with a mounted equipment control device 2a and a mounted equipment control device 2b that control various devices installed in the mounted equipment body A. Hereinafter, when it is not necessary to distinguish the mounted equipment control device 2a and the mounted equipment control device 2b from each other, they are referred to as a plurality of mounted equipment control devices 2. Alternatively, three or more mounted equipment control devices 2 may be installed in the mounted equipment body A, in addition to a case where two mounted equipment control devices 2 are installed in the mounted equipment body A as shown in FIG. 1.

The vehicle body B is equipped with a vehicle body control device 3 that controls the vehicle body B. The vehicle body control device 3 includes a storage part (a storage part 31 in FIG. 2) and a transmitting part (a transmitting part 32 in FIG. 2). The storage part 31 stores information used for controlling the vehicle body B. The storage part 31 contains storage media such as a Read Only Memory (ROM), a Random Access Memory (RAM), and a hard disk. The storage part 31 stores vehicle body information including control information used for controlling the vehicle body B and vehicle-body-side identification information for identifying the control information.

The transmitting part 32 is a wireless communication module for transmitting at least any of information concerning the vehicle body B and information concerning the mounted equipment body A to the vehicle body server 4. The transmitting part 32 can transmit information to the vehicle body server 4 using a mobile phone network, for example. The mobile phone network is the fourth generation mobile communication system or the fifth generation mobile communication system, for example. The transmitting part 32 may transmit information to the vehicle body server 4 using Wi-Fi (a registered trademark) or Bluetooth (a registered trademark).

The plurality of mounted equipment control devices 2 transmit and receive mounted equipment information to control various devices installed in the mounted equipment body A. The more mounted equipment control devices 2 installed in the mounted equipment body A, the more mounted equipment information is output from the mounted equipment control devices 2, and therefore, it takes a long time to acquire the desired information.

Accordingly, the vehicle V is equipped with a mounted equipment information acquisition apparatus 1 that acquires only necessary information among a plurality of pieces of mounted equipment information that is transmitted and received between the plurality of mounted equipment control devices 2. Hereinafter, a configuration of the mounted equipment information acquisition apparatus 1 will be described.

Figures 2, 3:
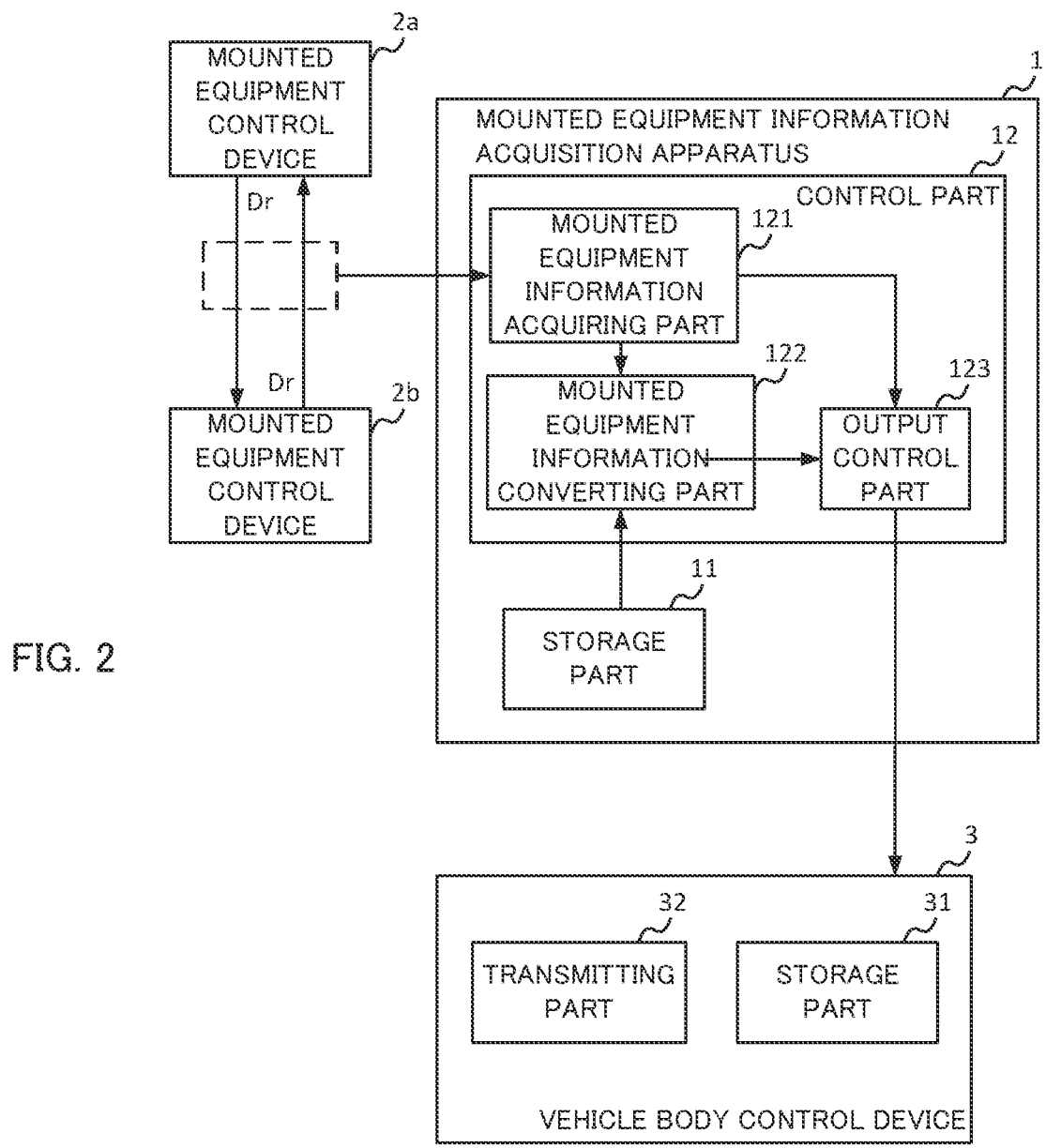
FIG. 2 is a diagram for explaining a configuration of a mounted equipment information acquisition apparatus according to the embodiment.
FIG. 3 schematically shows an acquisition table.

Configuration of the Mounted Equipment Information Acquisition Apparatus 1 According to the Embodiment FIG. 2 is a diagram for explaining a configuration of the mounted equipment information acquisition apparatus 1 according to the embodiment. The mounted equipment information acquisition apparatus 1 includes a storage part 11 and a control part 12. The storage part 11 contains storage media such as a ROM, a RAM, and a hard disk. The storage part 11 stores a program executed by the control part 12.

The storage part 11 stores acquisition information indicating mounted-equipment-side identification information included in one or more pieces of mounted equipment information to be acquired, among a plurality of pieces of mounted equipment information that is transmitted and received between the plurality of mounted equipment control devices 2. For example, the storage part 11 stores, as the acquisition information, an acquisition table including mounted-equipment-side identification information included in one or more pieces of mounted equipment information to be acquired. FIG. 3 schematically shows an acquisition table R. As shown in FIG. 3, [01], [02], and [04]

are stored as the mounted-equipment-side identification information included in the mounted equipment information to be acquired. It should be noted that the mounted-equipment-side identification information stored in the storage part 11 is identification information for identifying control information necessary for the management and operation of the mounted equipment body A, for example. The control information necessary for the management and operation of the mounted equipment body A is oil pressure of a cylinder, an operating time, or a failure code, for example.

Further, the storage part 11 may store a conversion rule in which the vehicle-body-side identification information used in the vehicle body control device 3 is associated with the mounted-equipment-side identification information. Specifically, the storage part 11 stores a conversion table in which the vehicle-body-side identification information is associated with the mounted-equipment-side identification information, as the conversion rule. The storage part 11 can store the conversion rule by associating the vehicle-body-side identification information with each piece of the mounted-equipment-side identification information in the acquisition table R. As shown in FIG. 3, the mounted-equipment-side identification information and the vehicle-body-side identification information are associated with each other in one-to-one correspondence.

The control part 12 is a calculation resource including a processor such as a Central Processing Unit (CPU). By executing a program stored in the storage part 11, the control part 12 functions as a mounted equipment information acquiring part 121, a mounted equipment information converting part 122, and an output control part 123.

Figure 4:
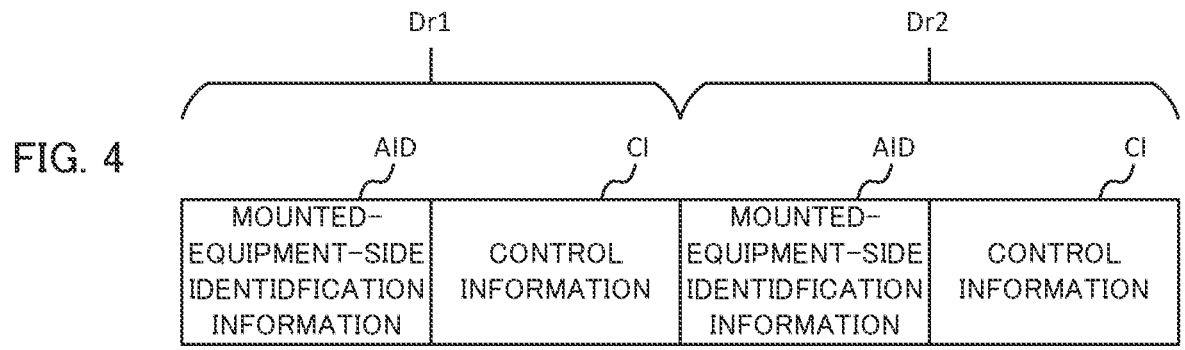
FIG. 4 is a diagram for explaining mounted equipment information.

The mounted equipment information acquiring part 121 acquires mounted equipment information including control information used for controlling the mounted equipment body A and mounted-equipment-side identification information for identifying the control information. FIG. 4 is a diagram for explaining mounted equipment information Dr. The mounted equipment control device 2 outputs a plurality of pieces of mounted equipment information Dr (mounted equipment information Dr1 and mounted equipment information Dr2). Alternatively, the mounted equipment control device 2 may output one piece of mounted equipment information Dr or three or more pieces of mounted equipment information Dr.

The mounted equipment information Dr includes mounted-equipment-side identification information AID and control information CI. Each piece of the mounted-equipment-side identification information AID and the control information CI is digital data represented by 0 and 1. It should be noted that the mounted equipment control device 2 outputs the plurality of pieces of mounted equipment information Dr at a predetermined time interval. The predetermined time interval is 30 milliseconds, for example. The mounted equipment information acquiring part 121 sequentially acquires the mounted equipment information Dr output by the mounted equipment control device 2.

The mounted equipment information acquiring part 121 may acquire mounted equipment information Dr at an interval longer than the time interval at which the mounted equipment control device 2 outputs mounted equipment information Dr. For example, the mounted equipment information acquiring part 121 acquires mounted equipment information Dr output from the mounted equipment control device 2 after 100 milliseconds, longer than 30 milliseconds, have passed since the mounted equipment information Dr was acquired. Specifically, the mounted equipment information acquiring part 121 discards mounted equipment information Dr output from the mounted equipment control device 2 by the time when 100 milliseconds pass after mounted equipment information Dr was acquired. Due to this, the mounted equipment information acquiring part 121 can reduce the processing load by preventing the acquisition of more information than necessary.

The control information CI is information for controlling the mounted equipment body A, such as the oil pressure of a cylinder, an operating state of various devices installed in the mounted equipment body A, or a failure code used when a failure occurs in the various devices. The control information CI may include the name of a mounted equipment manufacturer, a model or a type of the mounted equipment body, a product serial number of the mounted equipment body, or the like. It should be noted that the mounted equipment information acquiring part 121 can acquire the control information CI without knowing details of the control information CI. In other words, the mounted equipment information acquiring part 121 acquires the control information CI as digital data represented by binary numbers of 0 and 1, and does not acquire details of the information indicated by the acquired digital data. Alternatively, the control information CI may be represented not only by binary numbers but also by hexadecimal numbers. Due to this, another user cannot grasp what the value of the control information CI means, for example. As a result, a user who manages the mounted equipment server 5 can keep the content of the control information CI secret from other users.

The mounted equipment information acquiring part 121 monitors communication between the plurality of mounted equipment control devices 2 installed in the mounted equipment body A. Specifically, the mounted equipment information acquiring part 121 monitors communication performed between the mounted equipment control device 2a and the mounted equipment control device 2b so as not to disrupt the communication (see a broken line in FIG. 2).

When the mounted equipment information Dr including the mounted-equipment-side identification information AID stored in the storage part 11 is transmitted and received, the mounted equipment information acquiring part 121 acquires the mounted equipment information Dr. Specifically, the mounted equipment information acquiring part 121 determines whether or not the mounted equipment information Dr that is transmitted and received between the mounted equipment control device 2a and the mounted equipment control device 2b includes the mounted-equipment-side identification information AID stored in the storage part 11. More specifically, the mounted equipment information acquiring part 121 determines whether or not the mounted equipment information Dr that is transmitted and received includes any of the mounted-equipment-side identification information AID [01], [02], or [04] included in the acquisition table R stored in the storage part 11. Then, if the mounted equipment information Dr that is transmitted and received between the mounted equipment control device 2a and the mounted equipment control device 2b includes the mounted-equipment-side identification information AID in the acquisition table R, the mounted equipment information acquiring part 121 copies the mounted equipment information Dr and acquires a copy of the mounted equipment information Dr.

Figure 5:
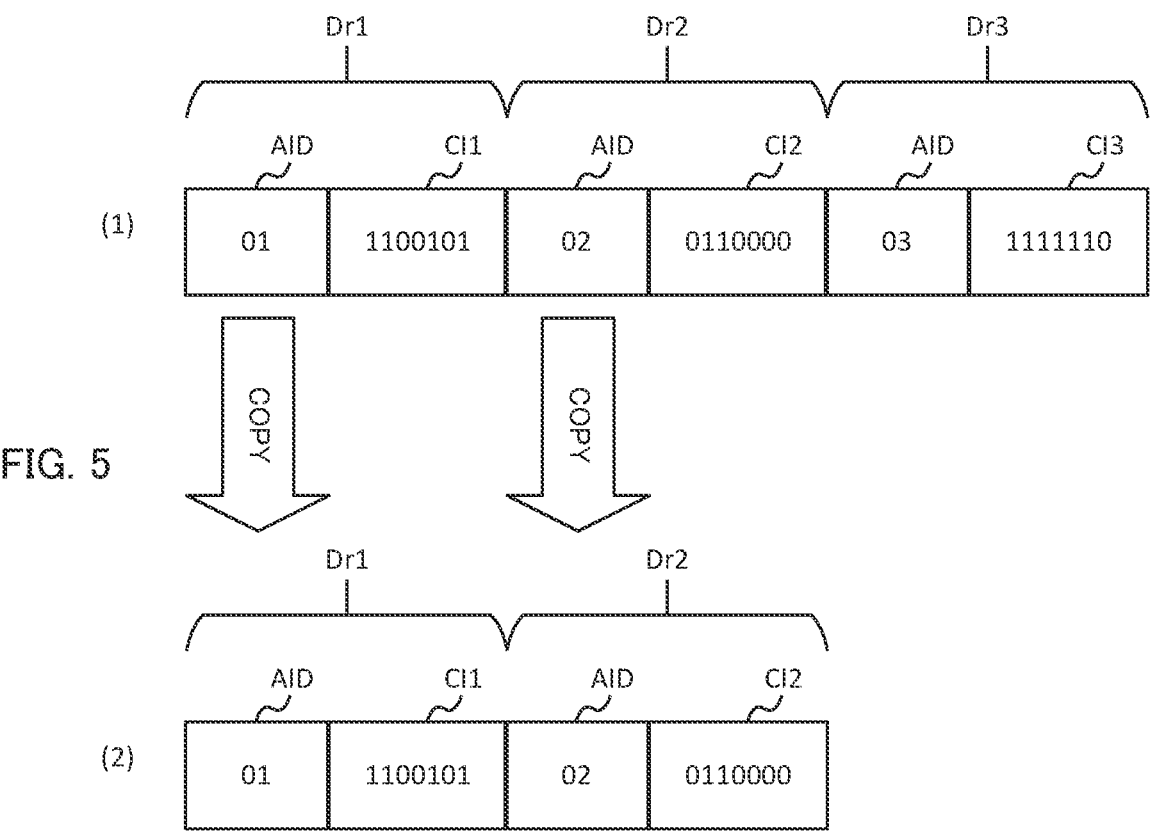
FIG. 5 is a diagram for explaining processing of acquiring the mounted equipment information.

FIG. 5 is a diagram for explaining processing of acquiring mounted equipment information Dr. The portion (1) in FIG. 5 schematically shows a plurality of pieces of mounted equipment information Dr that is transmitted and received between the plurality of mounted equipment control devices 2. As shown in FIG. 5, it is assumed that mounted equipment information Dr1, mounted equipment information Dr2, and mounted equipment information Dr3 are transmitted and received between the plurality of mounted equipment control devices 2. The mounted equipment information acquiring part 121 specifies mounted-equipment-side identification information AID included in the mounted equipment information Dr1, the mounted equipment information Dr2, and the mounted equipment information Dr3, respectively. Then, the mounted equipment information acquiring part 121 copies each piece of the mounted equipment information Dr1 including the mounted-equipment-side identification information AID [01] and the mounted equipment information Dr2 including the mounted-equipment-side identification information AID [02], both of which are included in the acquisition table R, and acquires respective copies thereof. Since the mounted-equipment-side identification information AID [03] of the mounted equipment information Dr3 is not included in the acquisition table R, the mounted equipment information acquiring part 121 does not acquire the mounted equipment information Dr3. The portion (2) in FIG. 5 shows a plurality of pieces of mounted equipment information Dr (the mounted equipment information Dr1 and the mounted equipment information Dr2) acquired by the mounted equipment information acquiring part 121.

The mounted equipment information acquiring part 121 does not need to acquire mounted equipment information Dr until a predetermined time has passed from the previous instance of acquiring mounted equipment information Dr. For example, after acquiring mounted equipment information Dr, the mounted equipment information acquiring part 121 does not acquire mounted equipment information Dr including the mounted-equipment-side identification information AID stored in the storage part 11, even if the mounted equipment information Dr is being transmitted and received by the time when a predetermined time has passed from when mounted equipment information Dr was acquired previously. The predetermined time is longer than a time interval (for example, 30 milliseconds) at which the plurality of mounted equipment control devices 2 transmit and receive mounted equipment information Dr, and the predetermined time is 100 milliseconds, for example.

Then, if the mounted equipment information Dr including the mounted-equipment-side identification information AID stored in the storage part 11 is transmitted and received between the plurality of mounted equipment control devices 2 after the predetermined time has passed since mounted equipment information Dr was acquired previously, the mounted equipment information acquiring part 121 acquires the mounted equipment information Dr including the mounted-equipment-side identification information AID. Due to this, the mounted equipment information acquiring part 121 can prevent the acquisition of more pieces of mounted equipment information Dr than are necessary for the management and operation of the mounted equipment body A.

The mounted equipment information converting part 122 converts the mounted-equipment-side identification information AID included in the mounted equipment information Dr into vehicle-body-side identification information BID associated with the mounted-equipment-side identification information AID. Specifically, first, the mounted equipment information converting part 122 refers to the acquisition table R stored in the storage part 11, and specifies the vehicle-body-side identification information BID associated with the acquired mounted-equipment-side identification information AID. Then, the mounted equipment information converting part 122 converts the acquired mounted-equipment-side identification information AID into the specified vehicle-body-side identification information BID. It should be noted that the mounted equipment information converting part 122 converts the mounted-equipment-side identification information AID included in the mounted equipment information Dr into the vehicle-body-side identification information BID, but does not convert the control information CI.

Figure 6:
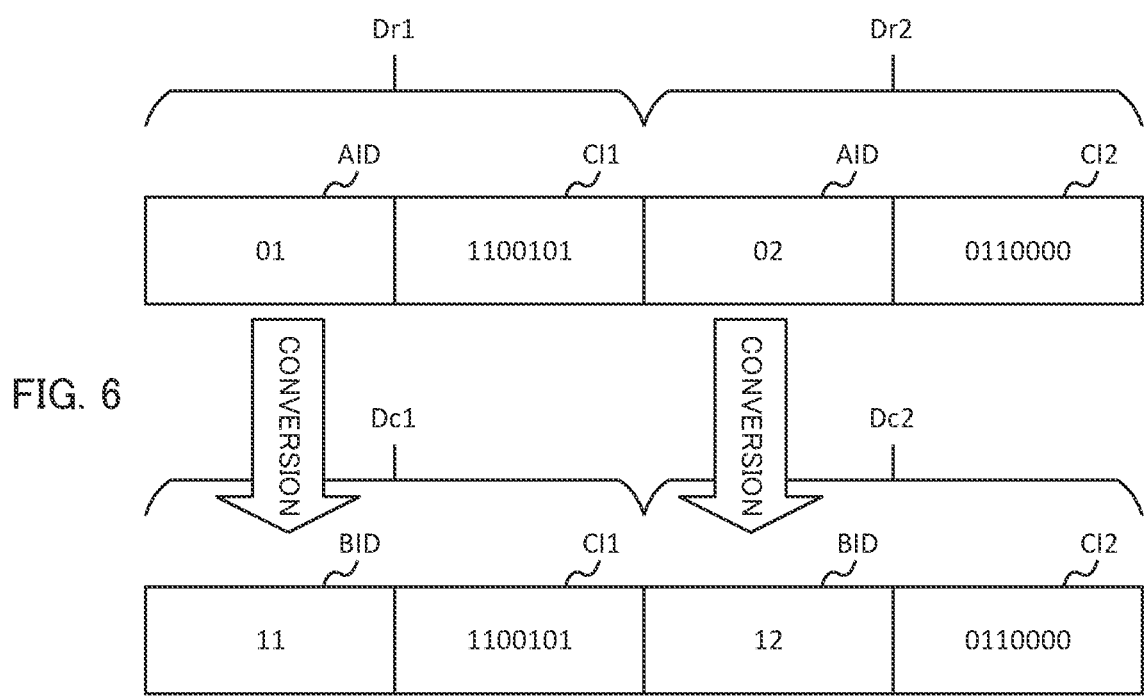
FIG. 6 is a diagram for explaining processing of converting the mounted equipment information into converted mounted equipment information.

FIG. 6 is a diagram for explaining processing of converting mounted equipment information Dr into converted mounted equipment information Dc. As shown in FIG. 56, the mounted equipment information converting part 122 converts the mounted-equipment-side identification information AID [01] included in the mounted equipment information Dr1 into the vehicle-body-side identification information BID [11] by referring to the acquisition table R, and does not convert the control information CI1 [1100101] included in the mounted equipment information Dr1.

The output control part 123 outputs the mounted equipment information Dr to the vehicle body control device 3. For example, the output control part 123 outputs the mounted equipment information Dr to the vehicle body control device 3, thereby causing the storage part 31 of the vehicle body control device 3 to store the mounted equipment information Dr. Further, the output control part 123 may output converted mounted equipment information Dc obtained by converting the mounted equipment information Dr with the mounted equipment information converting part 122 to the vehicle body control device 3, thereby causing the converted mounted equipment information Dc to be stored in the storage part 31. Due to this, the vehicle body control device 3 can store the control information CI necessary for the management and operation of the mounted equipment body A in the storage part 31.

Further, the output control part 123 may causes the mounted equipment information Dr to be output to at least one of the vehicle body server 4 and the mounted equipment server 5, which are external devices, via the transmitting part 32 of the vehicle body control device 3. In this case, the mounted equipment control device 2 outputs a transmission instruction to output the mounted equipment information Dr to the external device, and the mounted equipment information acquiring part 121 further acquires the transmission instruction.

Figure 7:
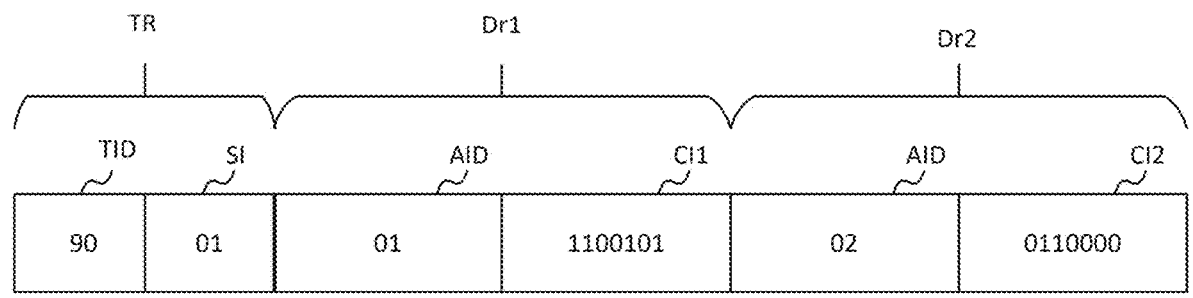
FIG. 7 is a diagram for explaining a transmission instruction.

FIG. 7 is a diagram for explaining a transmission instruction TR. The mounted equipment control device 2 outputs the transmission instruction TR together with the mounted equipment information Dr. The transmission instruction TR includes transmission identification information TID for identifying the transmission instruction TR and instruction information SI indicating whether or not to transmit the mounted equipment information Dr, for example. The transmission identification information TID is set in advance, and [90] is set as the transmission identification information TID in the present embodiment. Further, in the present embodiment, if the instruction information SI is [00], the instruction information SI indicates that the mounted equipment information Dr is not to be transmitted, and if the instruction information SI is [01], the instruction information SI indicates that the mounted equipment information Dr is to be transmitted.

The mounted equipment information acquiring part 121 acquires the transmission instruction TR output by the mounted equipment control device 2. If the mounted equipment information acquiring part 121 acquires the transmission instruction TR including the instruction information [01] indicating that the mounted equipment information Dr is to be transmitted, the mounted equipment information acquiring part 121 notifies the output control part 123 of an instruction to transmit the mounted equipment information Dr1 acquired together with the transmission instruction TR. Then, upon receiving the instruction to transmit the mounted equipment information Dr1 from the mounted equipment information acquiring part 121, the output control part 123 transmits the mounted equipment information Dr to the mounted equipment server 5 via the transmitting part 32 of the vehicle body control device 3 and the vehicle body server 4. Further, the output control part 123 may transmit the converted mounted equipment information Dc, obtained by converting the mounted-equipment-side identification information AID into the vehicle-body-side identification information BID with the mounted equipment information converting part 122, to the mounted equipment server 5.

In this way, the output control part 123 can transmit the mounted equipment information Dr to the mounted equipment server 5 at the timing when the mounted equipment control device 2 has output the transmission instruction TR. Therefore, having the mounted equipment control device 2 output the transmission instruction TR at a predetermined timing makes it possible to transmit the mounted equipment information Dr to the mounted equipment server 5 at a predetermined timing. As a result, if a failure occurs in the mounted equipment body A, or if parts thereof need to be replaced, the mounted equipment information Dr can be immediately transmitted to the mounted equipment server 5 without causing the vehicle body control device 3 to store the mounted equipment information Dr.

Flow of Processing Executed by the Mounted Equipment Information Acquisition Apparatus 1

FIG. 8 is a flowchart showing an example of a flow of processing executed by the mounted equipment information acquisition apparatus 1. The mounted equipment information acquiring part 121 monitors communication between the plurality of mounted equipment control devices 2 (S1). For example, the mounted equipment information acquiring part 121 monitors communication performed between the mounted equipment control device 2a and the mounted equipment control device 2b so as not to disrupt the communication.

Next, the mounted equipment information acquiring part 121 determines whether or not the mounted equipment information Dr that is transmitted and received between the mounted equipment control device 2a and the mounted equipment control device 2b includes mounted equipment information Dr to be acquired (S2). Specifically, the mounted equipment information acquiring part 121 determines whether or not the mounted equipment information Dr being transmitted and received includes the mounted-equipment-side identification information AID stored in the storage part 11. More specifically, the mounted equipment information acquiring part 121 specifies the mounted-equipment-side identification information AID included in the mounted equipment information Dr being transmitted and received, and determines whether or not the specified mounted-equipment-side identification information AID is included in the acquisition table R.

If the mounted equipment information Dr being transmitted and received includes the stored mounted-equipment-side identification information AID ("Yes" in S2), the mounted equipment information acquiring part 121 copies the mounted equipment information Dr and acquires a copy of the mounted equipment information Dr (S3). The mounted equipment information acquiring part 121 waits for a predetermined time (e.g., 100 milliseconds) after acquiring the mounted equipment information Dr, and returns to the processing of S1 after a predetermined time has passed since the acquisition of the mounted equipment information Dr.

If the mounted equipment information Dr does not include the stored mounted-equipment-side identification information AID ("No" in S2), the mounted equipment information acquiring part 121 returns to the processing of S1 without acquiring the mounted equipment information Dr. The mounted equipment information acquisition apparatus 1 repeats the above-described processing while the vehicle V is being activated.

MODIFIED EXAMPLE

The mounted-equipment-side identification information AID stored in the storage part 11 may be rewritable. For example, the mounted equipment information acquisition apparatus 1 acquires new mounted-equipment-side identification information AID from the mounted equipment server 5 via the vehicle body server 4 and the vehicle body control device 3. Specifically, the mounted equipment information acquisition apparatus 1 acquires a new list including one or more pieces of mounted-equipment-side identification information AID. Then, the mounted equipment information acquisition apparatus 1 updates the mounted-equipment-side identification information AID in the acquisition table R stored in the storage part 11 of the mounted equipment information acquisition apparatus 1, to the mounted-equipment-side identification information AID included in the acquired new list. Thus, an operator who manufactures the mounted equipment body A can appropriately rewrite the mounted-equipment-side identification information AID so that mounted equipment information Dr to be acquired can be changed as necessary.

Effects of the Mounted Equipment Information Acquisition Apparatus 1 According to the Embodiment As described above, the mounted equipment information acquisition apparatus 1 according to the embodiment stores mounted-equipment-side identification information AID of mounted equipment information Dr including control information CI for controlling the mounted equipment body A and the mounted-equipment-side identification information AID for identifying the control information CI. When the mounted equipment information Dr is transmitted and received between the plurality of mounted equipment control devices 2 installed in the mounted equipment body A, the mounted equipment information acquisition apparatus 1 acquires the mounted equipment information Dr including the stored mounted-equipment-side identification information AID. Due to this, the mounted equipment information acquisition apparatus 1 can acquire only necessary mounted equipment information Dr among the mounted equipment information Dr that is transmitted and received between the plurality of mounted equipment control devices 2.

The present disclosure is explained on the basis of the exemplary embodiments. The technical scope of the present disclosure is not limited to the scope explained in the above embodiments and it is possible to make various changes and modifications within the scope of the disclosure. For example, all or part of the apparatus can be configured with any unit which is functionally or physically dispersed or integrated. Further, new exemplary embodiments generated by arbitrary combinations of them are included in the exemplary embodiments. Further, effects of the new exemplary embodiments brought by the combinations also have the effects of the original exemplary embodiments.

DESCRIPTION OF THE REFERENCE NUMERALS 1 mounted equipment information acquisition apparatus
11 storage part
12 control part
121 mounted equipment information acquiring part
122 mounted equipment information converting part
123 output control part
2 mounted equipment control device
3 vehicle body control device
31 storage part
32 transmitting part
4 vehicle body server
5 mounted equipment server

The invention claimed is:

1. A mounted equipment information acquisition apparatus comprising:
   a storage media that stores identification information of mounted equipment information including control information for controlling a mounted equipment body and the identification information for identifying the control information; and
   a Central Processing Unit that acquires the mounted equipment information including the identification information stored in the storage media, when the mounted equipment information is transmitted and received between a plurality of mounted equipment control devices installed in the mounted equipment body, wherein the Central Processing Unit:
      does not acquire new mounted equipment information including the identification information stored in the storage media even if the new mounted equipment information including the identification information stored in the storage media is transmitted and received by the time when a predetermined time longer than a time interval at which the plurality of mounted equipment control devices transmit and receive the mounted equipment information, has passed after the mounted equipment information was acquired,
      acquires the new mounted equipment information including the identification information stored in the storage media if the new mounted equipment information including the identification information stored in the storage media is transmitted and received between the plurality of mounted equipment control devices after the predetermined time has passed since the mounted equipment information was acquired, and
      implements control of the mounted equipment body using the control information stored in the storage media and acquired by the Central Processing Unit.

2. The mounted equipment information acquisition apparatus according to claim 1, wherein
   the Central Processing Unit acquires a copy of the mounted equipment information that is transmitted and received between the plurality of mounted equipment control devices.

3. A mounted equipment information acquisition apparatus comprising:
   a storage media that stores identification information of mounted equipment information including control information for controlling a mounted equipment body and the identification information for identifying the control information;
   a Central Processing Unit that acquires the mounted equipment information including the identification information stored in the storage media, when the mounted equipment information is transmitted and received between a plurality of mounted equipment control devices installed in the mounted equipment body; and
   an output control part that outputs the mounted equipment information acquired by the Central Processing Unit to a vehicle body control device controlling a vehicle body connected to the mounted equipment body, to cause the storage media of the vehicle body control device to store the mounted equipment information acquired by the Central Processing Unit,
   wherein the Central Processing Unit further acquires a transmission instruction for outputting the mounted equipment information to an external device, and
      if the transmission instruction is acquired together with the mounted equipment information, the output control part causes the mounted equipment information to be transmitted to the external device without causing the mounted equipment information to be stored in the storage media of the vehicle body control device, and if only the mounted equipment information is acquired, the output control part causes the storage media of the vehicle body control device to store the mounted equipment information, and
   wherein the Central Processing Unit implements control of the mounted equipment body using the control information stored in the storage media and acquired by the Central Processing Unit.

4. The mounted equipment information acquisition apparatus according to claim 3, wherein
   the Central Processing Unit further acquires, together with the mounted equipment information, a transmission instruction for outputting the mounted equipment information to an external device, and
   if the Central Processing Unit acquires the transmission instruction, the output control part causes the mounted equipment information acquired by the Central Processing Unit to be output to the external device via the vehicle body control device.

5. The mounted equipment information acquisition apparatus according to claim 1, wherein
   the storage media stores acquisition information including identification information included in one or more pieces of mounted equipment information to be acquired among a plurality of pieces of the mounted equipment information that is transmitted and received between the plurality of mounted equipment control devices, and
   the Central Processing Unit acquires mounted equipment information including the identification information included in the acquisition information among the plurality of pieces of mounted equipment information that is transmitted and received between the plurality of mounted equipment control devices.

6. The mounted equipment information acquisition apparatus according to claim 5, wherein the Central Processing Unit acquires new acquisition information, and updates the acquisition information stored in the storage media to the acquired new acquisition information.

7. The mounted equipment information acquisition apparatus according to claim 1, wherein the control information includes at least one of: oil pressure of a cylinder, an operating state of a device installed in the mounted equipment body, and a failure code used when a failure occurs in the device.

* * * * *